(12) United States Patent
Nielsen et al.

(10) Patent No.: US 11,821,407 B2
(45) Date of Patent: Nov. 21, 2023

(54) WIND TURBINE WITH BLADES HINGED AT AN INTERMEDIATE POSITION

(71) Applicant: Vestas Wind Systems, Aarhus N. (DK)

(72) Inventors: Thomas S. Bjertrup Nielsen, Randers Sv (DK); Peter Bjørn Andersen, Skanderborg (DK)

(73) Assignee: Vestas Wind Systems A/S, Aarhus N (DK)

( * ) Notice: Subject to any disclaimer, the term of this patent is extended or adjusted under 35 U.S.C. 154(b) by 324 days.

(21) Appl. No.: 17/059,734

(22) PCT Filed: Jun. 12, 2019

(86) PCT No.: PCT/DK2019/050182
§ 371 (c)(1),
(2) Date: Nov. 30, 2020

(87) PCT Pub. No.: WO2019/238190
PCT Pub. Date: Dec. 19, 2019

(65) Prior Publication Data
US 2021/0207582 A1 Jul. 8, 2021

(30) Foreign Application Priority Data

Jun. 14, 2018 (DK) .................................. 2018 70395
Sep. 13, 2018 (DK) .................................. 2018 70588

(51) Int. Cl.
*F03D 7/02* (2006.01)
*F03D 1/06* (2006.01)

(52) U.S. Cl.
CPC ......... *F03D 7/0236* (2013.01); *F03D 1/0625* (2013.01); *F03D 7/0244* (2013.01); *F03D 7/0264* (2013.01); *F05B 2240/2022* (2013.01)

(58) Field of Classification Search
CPC ........ F05B 2240/2022; F05B 2240/224; F05B 2240/302; F05B 2240/307; F05B 2260/71;
(Continued)

(56) References Cited

U.S. PATENT DOCUMENTS 191,168 A    5/1877   Nesbitt
612,464 A  * 10/1898  Stewart ................... B64C 27/33
                                                416/138
(Continued)

FOREIGN PATENT DOCUMENTS

CN       102348889 A    2/2012
CN       104234925 A   12/2014
(Continued)

OTHER PUBLICATIONS

Danish Patent and Trademark Office, Search and Examination Report in PA 2018 70395, Nov. 15, 2018.
(Continued)

*Primary Examiner* — David E Sosnowski
*Assistant Examiner* — Theodore C Ribadeneyra
(74) *Attorney, Agent, or Firm* — Wood Herron & Evans LLP

(57) ABSTRACT

A wind turbine (1) comprising a tower (2), a nacelle (3) and a hub (7) is disclosed. The hub (7) comprises a blade carrying structure (4) with one or more wind turbine blades (5) connected thereto. Each of the wind turbine blades (5) defines an aerodynamic profile having a chord which varies along a length of the wind turbine blade (5). Each of the wind turbine blades (5) is connected to the blade carrying structure (4) via a hinge (6) at a hinge position of the wind turbine blade (5), each wind turbine blade (5) thereby being arranged to perform pivot movements relative to the blade carrying structure (4) between a minimum pivot angle and a
(Continued)

maximum pivot angle. The hinge position is arranged at a distance from the inner tip end (5a) and at a distance from the outer tip end (5b), and the chord at the hinge position is larger than or equal to the chord at the inner tip end (5a) and larger than the chord at the outer tip end (5b).

20 Claims, 14 Drawing Sheets

(58) Field of Classification Search
CPC .......... F05B 2260/78; F05B 2270/1011; F05B 2270/1014; F03D 7/0236; F03D 7/0212; F03D 7/022; F03D 7/0244; F03D 7/0264; F03D 7/0268
See application file for complete search history.

(56) References Cited

U.S. PATENT DOCUMENTS

| | | | | |
|---|---|---|---|---|
| 2,094,941 | A * | 10/1937 | Burkhartsmeier | F03D 7/0224 416/138 |
| 4,329,115 | A * | 5/1982 | Kress | F03D 7/0204 416/11 |
| 4,632,637 | A * | 12/1986 | Traudt | F03D 7/0224 416/41 |
| 2005/0196281 | A1 | 9/2005 | Kim et al. | |
| 2010/0143131 | A1 | 6/2010 | Pitre | |
| 2011/0211957 | A1 * | 9/2011 | Folsom | F03D 1/0658 416/135 |
| 2012/0134803 | A1 * | 5/2012 | McGrath | F03D 7/0264 416/1 |
| 2014/0322013 | A1 * | 10/2014 | Elkin | F03D 1/025 416/131 |

FOREIGN PATENT DOCUMENTS

| | | | |
|---|---|---|---|
| CN | 105508138 A | 4/2016 | |
| DE | 647287 C | 7/1937 | |
| EP | 0368374 A1 | 5/1990 | |
| GB | 2265672 A * | 10/1993 | ............. F03D 1/065 |
| JP | 2012251543 A | 12/2012 | |
| KR | 2013010682 A * | 1/2013 | |
| KR | 20130010682 A | 1/2013 | |

OTHER PUBLICATIONS

European Patent Office, International Search Report and Written Opinion in PCT Application No. PCT/KD2019/050182, dated Sep. 18, 2019.

China National Intellectual Property Administration, office acction issued in corresponding Chinese Application No. 201980045261.6, dated Apr. 29, 2023, with English translation.

China Natonal Intellectual Property Administration, office action issued in corresponding CN Application No. 201980045261.6, dated Aug. 1, 2023.

* cited by examiner

US 11,821,407 B2

WIND TURBINE WITH BLADES HINGED AT AN INTERMEDIATE POSITION

FIELD OF THE INVENTION

The present invention relates to a wind turbine comprising a tower, a nacelle and a hub comprising a blade carrying structure. One or more wind turbine blades are pivotally connected to the blade carrying structure via hinges.

BACKGROUND OF THE INVENTION

Wind turbines are normally controlled in order to provide a desired power output and in order to control loads on the wind turbine. For horizontal axis wind turbines, i.e. wind turbines with a rotor which rotates about a substantially horizontal rotational axis, this may be obtained by controlling a pitch angle of the wind turbine blades. In this case the angle of attack of the wind turbine blades relative to the incoming wind is adjusted by rotating the wind turbine blades about a longitudinal axis.

Traditional pitch control as described above requires sensor based controllers as well as mechanical parts, e.g. in the form of pitch bearings and drive units. Such controllers and mechanical parts require maintenance. This may be difficult in the case that the wind turbine is positioned at a remote location. In this case failure or breakdown may lead to extensive downtime, e.g. due to long transportation time for maintenance personnel or long delivery time on spare parts. It is therefore desirable to provide a wind turbine which can be controlled in a simple manner, and where the maintenance requirements are reduced as compared to traditional pitch controlled wind turbines.

U.S. Pat. No. 4,632,637 discloses a high speed, downwind horizontal axis wind turbine having three circumferentially spaced lightweight blades having inner support arms radially outwardly disposed blade segments which are pivotally connected to the support arms, so as to fold straight downwind under high wind conditions or high rotating speeds.

DESCRIPTION OF THE INVENTION

It is an object of embodiments of the invention to provide a wind turbine with hinged wind turbine blades, in which the wind turbine blades are automatically and efficiently folded inwards at high wind speeds and/or high rotational speeds, and in which the wind turbine blades are configured for efficient energy extraction from the wind.

It is a further object of embodiments of the invention to provide a wind turbine with hinged wind turbine blades, in which the amount of material used for the wind turbine blades is reduced as compared to similar prior art wind turbines.

The invention provides a wind turbine comprising a tower, a nacelle mounted on the tower via a yaw system, a hub mounted rotatably on the nacelle, the hub comprising a blade carrying structure, and one or more wind turbine blades connected to the blade carrying structure, wherein each of the wind turbine blades defines an aerodynamic profile having a chord which varies along a length of the wind turbine blade between an inner tip end and an outer tip end, and wherein each of the wind turbine blades is connected to the blade carrying structure via a hinge at a hinge position of the wind turbine blade, each wind turbine blade thereby being arranged to perform pivot movements relative to the blade carrying structure between a minimum pivot angle and a maximum pivot angle, the hinge position being arranged at a distance from the inner tip end and at a distance from the outer tip end, and wherein the chord at the hinge position is larger than or equal to the chord at the inner tip end and larger than the chord at the outer tip end.

Thus, the wind turbine of the invention comprises a tower with a nacelle mounted thereon, via a yaw system. Accordingly, the nacelle can rotate about a substantially vertical rotational axis, relative to the tower, in order to direct a rotor of the wind turbine into the incoming wind. The yaw system may be an active yaw system in which the nacelle is rotated actively by means of a yaw drive mechanism, e.g. on the basis of measurements of the wind direction. As an alternative, the yaw system may be a passive yaw system in which the nacelle automatically rotates according to the wind direction without the use of a yaw drive mechanism.

The nacelle may be a traditional nacelle having an outer wall enclosing an interior of the nacelle, the nacelle housing various components of the wind turbine, such as generator, drive train, etc. As an alternative, the nacelle may simply be a structure which is capable of performing yawing movements relative to the tower. In this case some or all of the components described above may be arranged outside the nacelle, e.g. in an interior part of the tower.

A hub is mounted rotatably on the nacelle. The hub comprises a blade carrying structure having one or more wind turbine blades connected thereto. Accordingly, the wind turbine blades rotate along with the hub and the blade carrying structure relative to the nacelle.

The wind turbine is preferably a horizontal axis wind turbine.

Each of the wind turbine blades defines an aerodynamic profile having a chord which varies along a length of the wind turbine blade between an inner tip end and an outer tip end.

The aerodynamic profile may have a suction side and a pressure side, the suction side and the pressure side both extending between a leading edge and a trailing edge of the aerodynamic profile. Accordingly, the suction side and the pressure side meet at the leading edge and at the trailing edge. Air flowing across the aerodynamic profile flows from the leading edge, along the suction side and the pressure side, respectively, and towards the trailing edge. At the trailing edge, the air flow from the suction side and the air flow from the pressure side are rejoined. A difference in traveled distance of the air flow along the suction side and the pressure side causes aerodynamic lift on the aerodynamic profile, thereby allowing the wind turbine blade to extract energy from the wind. Thus, the aerodynamic profile of the wind turbine blades ensures that the wind turbine blades are capable of extracting energy from the wind.

The leading edge and the trailing edge each extends between the inner tip end and the outer tip end. Thus, the leading edge as well as the trailing edge extends along the entire length of the wind turbine blade.

In the present context the term 'inner tip end' should be interpreted to mean an extremity of the wind turbine blade which is arranged closest to the hub. Similarly, in the present context the term 'outer tip end' should be interpreted to mean an extremity of the wind turbine blade which is arranged furthest away from the hub. It should be noted that the terms 'closest to the hub' and 'furthest away from the hub' refer to the positions of the tip ends within a pivot angle interval which occurs during normal operation of the wind turbine. Thus, each wind turbine blades extends along a longitudinal direction between the inner tip end and the outer tip end of the wind turbine blade. In the present context the term 'longitudinal direction' should be interpreted to mean a direction in which the wind turbine blade is longer than in any other direction. Thus, the inner tip end and the outer tip end form extremities of the wind turbine blade in this longitudinal direction.

In the present context the term 'chord' should be interpreted to mean a distance between a leading edge and a trailing edge of the wind turbine blade. Accordingly, this distance varies as a function of the position along the length of the wind turbine blade.

Each of the wind turbine blades is connected to the blade carrying structure via a hinge at a hinge position of the wind turbine blade. Thereby each wind turbine blade is arranged to perform pivot movements relative to the blade carrying structure, via the hinge. The pivoting movements preferably take place about a pivot axis which is arranged substantially perpendicular to the longitudinal direction of the wind turbine blade. Accordingly, during pivoting movements of the wind turbine blades, the inner tip end and the outer tip end are the portions of the wind turbine blades, on either side of the hinge position, which are moved the longest distance, and the longitudinal direction of the wind turbine blade is pivoted.

A pivot angle is thereby defined between each wind turbine blade and the blade carrying structure, depending on the position of the hinge and thereby of the wind turbine blade relative to the blade carrying structure. Accordingly, the pivot angle defines the direction along which a given wind turbine blade extends relative the blade carrying structure, and thereby relative to the hub. This, in turn, determines a diameter of the rotor, and thereby the ability of the wind turbine to extract energy from the wind.

The hinge may be or comprise a bearing, e.g. in the form of a journal bearing, a roller bearing, or any other suitable kind of bearing.

The pivot angle can vary between a minimum pivot angle, defining a minimum rotor diameter, and a maximum pivot angle, defining a maximum rotor diameter.

The hinge position is arranged on the wind turbine blade at a distance from the inner tip end and at a distance from the outer tip end. Accordingly, the wind turbine blade is hinged to the blade carrying structure at a position which is not at an end of the wind turbine blade, contrary to conventional pitch controlled wind turbines, where the wind turbine blades are attached to the hub at a root end of the wind turbine blade.

The chord at the hinge position is larger than or equal to the chord at the inner tip end and larger than the chord at the outer tip end. This is possible because blade loads increase towards the hinge on both the inner and outer part of the blade, and because neither the inner part, nor the outer part of the wind turbine blade needs to make a change in the aerodynamic profile towards a circular shape, which is a requirement for more classic wind turbine blades connected to a hub via a pitch system. Thereby the part of the wind turbine blade which is arranged between the hinge position and the outer tip end, as well as the part of the wind turbine blade which is arranged between the hinge position and the inner tip end can define optimal aerodynamic profiles and blade geometry, i.e. profiles and geometry which contribute to extracting more energy from the wind. Furthermore, excess wind turbine blade material can be avoided, e.g. due to the lower loads and due to the lack of requirements to transfer the blade profile to a circular shape. Thereby the weight of the wind turbine blades can be reduced as compared to traditional wind turbine blades. Furthermore, such shape of the wind turbine blade is found to reduce tip losses, and based on in-depth investigations found to generate a more stable pivot control when the blades are close to the minimum pivot angle.

The hinge position of each of the wind turbine blades may be at a position defining a maximum chord. According to this embodiment, the hinge position defines the position along the length of the wind turbine blade where the chord is largest. Accordingly, the chord will be smaller at any other position than the hinge position.

As an alternative, there may be positions along the length of the wind turbine blade where the chord is larger than at the hinge position, as long as the chord at the hinge position is larger than or equal to the chord at the inner tip end as well as larger than the chord at the outer tip end.

The chord of the aerodynamic profile of each of the wind turbine blades may decrease from the hinge position towards the inner tip end and from the hinge position towards the outer tip end. According to this embodiment, the chord is maximum at the hinge position, and decreases continuously towards minimum chords at the inner and outer tip ends.

As an alternative, the chord may vary in a non-monotonous manner from the hinge position towards the inner tip end and/or towards the outer tip end.

Each of the wind turbine blades may have a centre of mass for the wind turbine blade at rest, the centre of mass being positioned between the hinge position and the inner tip end of the wind turbine blade. According to this embodiment, the centre of mass for the wind turbine blade is arranged in a part of the wind turbine blade which is arranged closer to the hub than the hinge position. In this case, when the hub rotates relative to the nacelle, a centrifugal force acts on each of the wind turbine blades, at the position of the centre of mass. Thereby the centrifugal force will tend to push the part of the wind turbine blade arranged between the hinge position and the inner tip end, i.e. the part of the wind turbine blade where the centre of mass is arranged, in an outwards direction. This will cause the wind turbine blades to pivot via the hinges in such a manner that the wind turbine blades are rotated towards a position where the longitudinal direction of the wind turbine blades is arranged substantially parallel to the rotational axis of the hub. Thereby the wind turbine blades are pivoted in such a manner that the diameter of the rotor is reduced. The higher the rotational speed, the further the wind turbine blades will be pivoted towards this position.

Thus, according to this embodiment, the diameter of the rotor is automatically reduced as the rotational speed of the hub increases. Accordingly, the rotor diameter, and thereby the ability of the wind turbine to extract energy from the wind, is automatically adjusted according to the prevailing wind speed, without requiring complicated control algorithms or maintenance requiring mechanical parts, such as pitch mechanisms, etc.

Alternatively or additionally, aerodynamic forces acting on the aerodynamic profiles of the wind turbine blades may cause the wind turbine blades to pivot in such a manner that the diameter of the rotor is reduced as the wind speed increases. In a preferred embodiment, the centrifugal force and the aerodynamic forces cooperate in reducing the rotor diameter as the wind speed increases, i.e. they are not counteracting each other. For some wind turbines, e.g. small wind turbines, the centrifugal force may be the dominating factor with respect to ensuring that the wind turbine blades are pivoted towards smaller rotor diameter. For other wind turbines, e.g. larger wind turbines, the aerodynamic forces may be the dominating factor.

The wind turbine may further comprise a balancing mass arranged on the nacelle at a position opposite to an attachment position of the hub. The hub and the balancing mass may preferably be arranged at opposing sides of the tower in the sense that the hub and the balancing mass are arranged on parts of the nacelle which are positioned at opposing sides of a region of the nacelle which defines an interface towards the tower. The hub and the wind turbine blades connected thereto will normally be relatively heavy, and gravity acting on the hub and the wind turbine blades may thereby introduce substantive loads in the wind turbine. By positioning a balancing mass on the nacelle in the manner described above, the loads introduced by gravity acting on the hub and the wind turbine blades, in particular tilt moments, are at least partly counteracted. The weight of the balancing mass may be selected in such a manner that it precisely balances the weight of the hub and the wind turbine blades.

The wind turbine may be a downwind wind turbine. According to this embodiment, the rotor faces away from the incoming wind, i.e. the wind reaches the wind turbine blades after having passed the nacelle. Downwind wind turbines are very suitable for applying passive yaw systems, i.e. yaw systems which automatically direct the rotor of the wind turbine towards the incoming wind without the use of yaw drives and control systems. This further reduces the need for components which are prone to require maintenance. Furthermore, in downwind wind turbines a passive cooling system can be arranged upwind with respect to the rotor, thereby enabling improved cooling of various wind turbine components.

As an alternative, the wind turbine may be an upwind wind turbine, in which case the rotor faces the incoming wind.

The wind turbine may further comprise biasing means biasing the wind turbine blades towards a position providing a maximum rotor diameter of the wind turbine. According to this embodiment, the wind turbine blades will be in a position providing a maximum rotor diameter when no other forces act on the wind turbine blades. In particular, when the wind speed is low and the hub therefore does not rotate, or only rotates at a low rotational speed, no or only a small centrifugal force acts on the wind turbine blades. Since the biasing means biases the wind turbine blades towards a maximum rotor diameter, the rotor diameter is large under these conditions. Thereby it is ensured that the wind turbine is capable of extracting as much energy as possible from the wind. It is also ensured that the wind turbine blades are actually in a position where they are capable of catching the wind and cause the hub to rotate once the wind speed increases.

On the other hand, when the wind speed is higher, the hub rotates at a higher rotational speed, and thereby the centrifugal force acting on the wind turbine blades is larger. At some point the centrifugal force becomes sufficiently large to at least partly overcome the biasing force of the biasing means, and thereby the wind turbine blades will start pivoting towards a position defining a minimum rotor diameter, i.e. the rotor diameter decreases. Due to the biasing force it is ensured that this decrease in rotor diameter is obtained in a smooth and gradual manner.

The biasing means could, e.g., comprise springs mounted on the wind turbine blades.

The wind turbine may further comprise end stop mechanisms arranged to slow pivot movements of the wind turbine blades in a region near the minimum pivot angle and/or in a region near the maximum pivot angle. According to this embodiment it is ensured that the pivoting movements of the wind turbine blades are not stopped abruptly at the minimum pivot angle and/or at the maximum pivot angle. Instead, the end stop mechanisms ensure that the pivoting movements are stopped in a smooth and gradual manner. This protects the wind turbine blades as well as parts arranged in the vicinity of the wind turbine blades from damage caused by collisions.

The end stop mechanism may comprise a spring and/or a damper. For instance, the end stop mechanism could include springs mounted on the wind turbine blades and/or resilient pads which the wind turbine blades abut at the minimum pivot angle and/or at the maximum pivot angle. The springs could, e.g., be in the form of torsional springs arranged in the hinge or compressible springs mounted between the blade carrying structure and the wind turbine blades. The compressible springs could, e.g., be in a neutral state at a medium pivot angle, in a compressed state at smaller pivot angles and in a stretched state at larger pivot angles, or vice versa. In this case the compressible springs are capable of slowing down pivoting movements of the wind turbine blades at small pivot angles as well as at large pivot angles.

The wind turbine may further comprise a stop mechanism arranged to move the wind turbine blades to a safe pivot angle in the case of an emergency. According to this embodiment, the wind turbine blades are protected in the case of an emergency. It is also not ruled out that the stop mechanism is activated in the case that it is desired to stop operation of the wind turbine and move the wind turbine blades to the safe pivot angle for other reasons than an emergency.

The safe pivot angle may arrange the wind turbine blades in such a manner that each wind turbine blade extends along a direction which is substantially parallel to a rotational axis of the hub. This position of the wind turbine blades defines a minimum rotor diameter and is sometimes referred to as 'barrel mode'. In the case that the stop mechanism is activated for other reasons than an emergency, the safe pivot angle may arrange the wind turbine blades at a small angle with respect to the rotational axis of the hub. This angle may be dependent on the wind speed.

The stop mechanism may comprise a release mechanism and at least one spring biased wire interconnecting the release mechanism and each of the wind turbine blades. In the present context the term 'wire' should be interpreted to mean a part which interconnects the release mechanism and one of the wind turbine blades. The wire may be capable of providing a pulling force to the wind turbine blades. The wire could, e.g., be in the form of a traditional steel wire, a rope, a chain, a belt, etc. In the case that the wire is in the form of a belt, it may, e.g., be a carbon fibre belt, which is very durable and capable of withstanding repeated movement over pulleys or the like.

According to this embodiment, the spring biased wire keeps the wind turbine blades in a desired position during normal operation. Due to the spring bias, the wind turbine blades are, however, allowed to pivot towards smaller rotor diameter in the case that the centrifugal force acting on the wind turbine blades is sufficient to at least partly overcome the biasing force of the spring. Thereby it is ensured that the rotor diameter automatically adapts to the wind speed, as described above.

In the case that it is necessary to stop the wind turbine, the release mechanism is activated, and thereby the spring biased wire is released from the release mechanism. Thereby the wind turbine blades are no longer kept in position by the wire, and they are immediately moved towards the safe position.

The spring biased wire may be a stiff wire having a spring portion. As an alternative, the spring biased wire may be in the form of an elastic rope.

Each wind turbine blade may be connected to the release mechanism via a separate spring biased wire. The separate wires may further be connected to separate release mechanisms. As an alternative, each wind turbine blade may be connected to a common wire, e.g. extending inside the tower, via a separate connecting wire. In this case the common wire may be spring biased, while the connecting wires are stiff, or the connecting wires may be spring biased while the common wire is stiff. As an alternative, the connecting wires as well as the common wire may be spring biased.

The release mechanism may, e.g., be in the form of a winch onto which the spring biased wire is rolled. In this case the release mechanism can easily be released by removing a braking mechanism from the winch, thereby allowing it to rotate freely and release the spring biased wire. The release mechanism may be arranged at a lower part of the tower, where it can be easily accessed by maintenance personnel.

The blade carrying structure may comprise one or more arms, and each of the wind turbine blades may be mounted on one of the arms of the blade carrying structure.

Each of the wind turbine blades may comprise an inner portion including the inner tip end and an outer portion including the outer tip end, and the inner portion and the outer portion may be joined to each other. According to this embodiment, the wind turbine blades are segmented in the sense that they are each made from separate parts which are joined to each other to form the wind turbine blade. This makes it easier to transport the wind turbine blades, since the parts of the wind turbine blades can be transported separately, and the wind turbine blades can be assembled at the site of the wind turbine. The inner portion and the outer portion may be joined to each other in a region at or near the hinge position. Since the presence of the hinge in any event interferes with the geometry and structure of the wind turbine blade, joining the inner part and the outer part to each other in this region introduces no significant further interference with the geometry and structure.

As an alternative, the inner portion and the outer portion may be joined to each other in a region away from the hinge position. For instance, the hinge position may be arranged in the outer portion of the wind turbine blade, in which case the joint between the inner portion and the outer portion will be arranged between the hinge position and the inner tip end. This may result in a centre of mass of the wind turbine blade to be arranged between the hinge position and the inner tip end. Alternatively, the hinge position may be arranged in the inner portion of the wind turbine blade, in which case the joint between the inner portion and the outer portion will be arranged between the hinge position and the outer tip end. This may reduce the maximum transport length of the longest part of the wind turbine blade.

Each of the wind turbine blades may further comprise a hinge portion including the hinge position, and the hinge portion may interconnect the inner portion and the outer portion. According to this embodiment, the hinge is mounted on a separate portion of the wind turbine blade, i.e. the hinge portion. Thereby the hinge portion can be designed to meet requirements at the hinge position, e.g. with respect to strength and material thickness, without having to consider other requirements which may be relevant for other parts of the wind turbine blade, e.g. with respect to weight, aerodynamic properties, flexibility, etc.

The hinge of each of the wind turbine blades may be embedded in the wind turbine blade. According to this embodiment, the actual hinge does not protrude from an outer surface of the wind turbine blade, and thereby the aerodynamic properties of the wind turbine blade are maintained in the hinge region, resulting in less penalty with respect to power production. As an alternative, the hinge may be attached to an outer surface of the wind turbine blade.

Each of the wind turbine blades may be provided with at least one winglet. A winglet may be arranged at or near the inner tip end and/or at or near the outer tip end of each of the wind turbine blades. The winglet may extend towards the suction side and/or towards the pressure side of the wind turbine blade. Providing the wind turbine blades with at least one winglet allows for a design with a shorter wind turbine blade, while maintaining the aerodynamic properties of a long wind turbine blade. This is especially beneficial at the inner tip end as this will shorten the inner blade resulting in a larger minimum possible distance between the inner tip and the tower. Such effect will reduce the required overhang, i.e. the required distance from the main bearing to the hub center, and as such reduced the loads on the main bearing. A winglet at the outer tip end is beneficial as this will reduce the length of the outer blade part resulting in less complicated blade transport and as such lower transport costs. The winglet may, e.g., be designed in such a way that the formation of tip vortices is reduced or altered, thereby reducing effects from downwash acting from the inner and/or outer tip towards the hinge position.

It should be noted that the winglets may have a width which exceeds the chord at the inner tip end or at the outer tip end, and even which exceeds the chord at the hinge position, as long as the chord at each tip end is smaller than or equal to the chord at the hinge position. The chord at the tip end in all embodiments with winglets is defined as the chord of the wind turbine blade prior to the start of the winglet, i.e. the chord at the end of the blade structure that holds the winglet. For instance, the tip end in all embodiments with winglets may be defined as the position with the minimum chord of the wind turbine blade found on the wind turbine blade further inboard of the winglet.

Each of the wind turbine blades may be provided with a balancing mass. For instance, the balancing mass may be arranged in an inner blade part, i.e. in a part of the wind turbine blade which is arranged between the inner tip end and the hinge position. Applying a balancing mass in this manner moves a centre of mass of the wind turbine blade at rest in a direction towards the inner tip end, as compared to an identical wind turbine blade without a balancing mass. Thereby, by selecting and positioning the balancing mass in an appropriate manner, the position of the centre of mass for the wind turbine blade at rest can be positioned at any desired position. For instance, the centre of mass for the wind turbine blade at rest may be arranged in a part of the wind turbine blade which is arranged closer to the hub than the hinge, thereby ensuring that the wind turbine blade is automatically pivoted towards larger pivot angles as the rotational speed increases, due to the centrifugal force, as described above.

The balancing mass could, e.g., be or be arranged in a winglet provided at or near the inner tip end.

The wind turbine may further comprise at least one deployable airbrake. According to this embodiment, in the case that it is desired to stop operation of the wind turbine, the at least one airbrake may be deployed, thereby causing the rotational movements of the hub to stop. A deployable airbrake may be arranged on each of the wind turbine blades. Alternatively or additionally, one or more deployable airbrakes may be arranged on the blade carrying structure, for instance one on each arm carrying the wind turbine blades. The deployable airbrakes may, e.g., be in the form of planar elements being retracted in the wind turbine blades and/or in the blade carrying structure during normal operation, and which are moved into a position where they protrude from the wind turbine blades or the blade carrying structure when they are deployed.

The hinge position of each of the wind turbine blades may be at a position defining a maximum thickness of the wind turbine blade. According to this embodiment, the hinge is attached to the wind turbine blade at position where the chord as well as the thickness of the wind turbine blade is maximum. Thereby it is ensured that optimal aerodynamic properties of the wind turbine blade are obtained along the entire length of the wind turbine blade, and any excess blade material can be avoided.

Alternatively or additionally, the hinge position of each of the wind turbine blades may be at a position defining a maximum thickness-to-chord ratio. In the present context the term 'thickness-to-chord ratio' should be interpreted to mean the ratio, at a given cross section found along the longitudinal direction of the wind turbine blade, between the thickness of the aerodynamic profile, i.e. the maximum distance between the suction side and the pressure side, and the chord, i.e. the linear distance between the leading edge and the trailing edge. The aerodynamic performance of an aerodynamic profile depends strongly on the thickness-to-chord ratio (t/c) of the aerodynamic profile. More particularly, the performance, e.g. in the form of maximum lift-to-drag ratio over relevant angle of attack intervals, increases as t/c decreases, and it is therefore desirable to design an aerodynamic profile with as low a t/c as possible, however down to a certain minimum level, for instance 15%. Accordingly, by designing the wind turbine blade in such a manner that t/c is higher at the hinge position that at each of the inner tip end and the outer tip end, it can be ensured that the aerodynamic performance of the wind turbine blade is optimized at the inboard part of the wind turbine blade as well at the outboard part of the wind turbine blade.

Each of the wind turbine blades may be curved in an edge-wise direction. For instance, at least a part of the inner blade part and/or at least a part of the outer blade part may follow a curved path in the edge-wise direction, rather than following a straight line. In the present context the term 'edge-wise direction' should be interpreted to mean a direction being along with or opposite to the movement of the wind turbine blade as it rotates along with the hub of the wind turbine. Thus, according to this embodiment the inner blade part and/or the outer blade part is curved towards the leading edge or towards the trailing edge.

Curving a wind turbine blade in the edge-wise direction is sometimes referred to as 'sweep'. When a wind turbine blade provided with sweep passes the tower of a wind turbine, the tower is passed gradually, since the sweep ensures that only a portion of the wind turbine blade is arranged adjacent to the tower at any given time. This reduces the loads on the wind turbine during tower passage, in particular loads on the wind turbine blade and on the tower.

Furthermore, sweep allows the wind turbine blade to perform torsional twists during a full rotation of the rotor. This levels out wobbles in suction acting on the wind turbine blade, thereby reducing loads on the wind turbine blade.

Finally, sweep results in local twist of the wind turbine blade which rotates the wind turbine blade towards a lower angle of attack in response to increased flap-wise loads. This also reduces loads on the wind turbine blade.

The inner blade part may be curved in the edge-wise direction, while the outer blade part follows a straight line in the edge-wise direction, or vice versa. Alternatively, the inner blade part as well as the outer blade part may be curved in the edge-wise direction. Each of the inner blade part and the outer blade part may be curved in a direction towards the leading edge or in a direction towards the trailing edge. In the case that the inner blade part as well as the outer blade part is curved in the edge-wise direction, they may be curved in the same direction, i.e. both curved in a direction towards the leading edge or in a direction towards the trailing edge, or they may be curved in opposite directions, i.e. one of the blade parts being curved in a direction towards the leading edge and the other being curved in a direction towards the trailing edge.

Alternatively or additionally, the inner blade part and/or the outer blade part may be designed with a twist, i.e. a rotation of each 2D airfoil found in a cross section of the wind turbine blade around the longitudinal axis of respectively the inner and outer blade part.

Each of the wind turbine blades may comprise a plurality of fibres arranged in parallel along the wind turbine blade, and the wind turbine blades may comprise a region in which an orientation of the fibres deviates from a main orientation of the fibres being substantially parallel to a leading edge or a trailing edge of the wind turbine blade.

Wind turbine blades are often manufactured from fibre glass comprising fibres and resin. The fibres may be arranged in parallel along a longitudinal direction of the wind turbine blade, and this direction determines how the wind turbine blade reacts to loads, in particular flap-wise loads, applied to the wind turbine blade by the wind, in particular with respect to deflection and twisting of the wind turbine blade. However, according to this embodiment, the fibres are arranged along a different direction in a region of the wind turbine blade, i.e. the fibres are, in this region, arranged 'off axis'. This has the consequence that this region of the wind turbine blade reacts differently to deflections in a flap-wise direction than the remaining part of the wind turbine blade. This causes the wind turbine blade to twist, resulting in the wind turbine blade being rotated towards a lower angle of attack in response to increased flap-wise loads. This also reduces loads on the wind turbine blade. In traditional pitch controlled wind turbines, this twisting behaviour is undesirable, because it introduces torsional loads on the pitch mechanism. However, for a wind turbine with hinged blades this is not an issue, since the wind turbine blades are not connected to the hub via a pitch system.

BRIEF DESCRIPTION OF THE DRAWINGS

The invention will now be described in further detail with reference to the accompanying drawings in which.

DETAILED DESCRIPTION OF THE DRAWINGS

Figure 1:
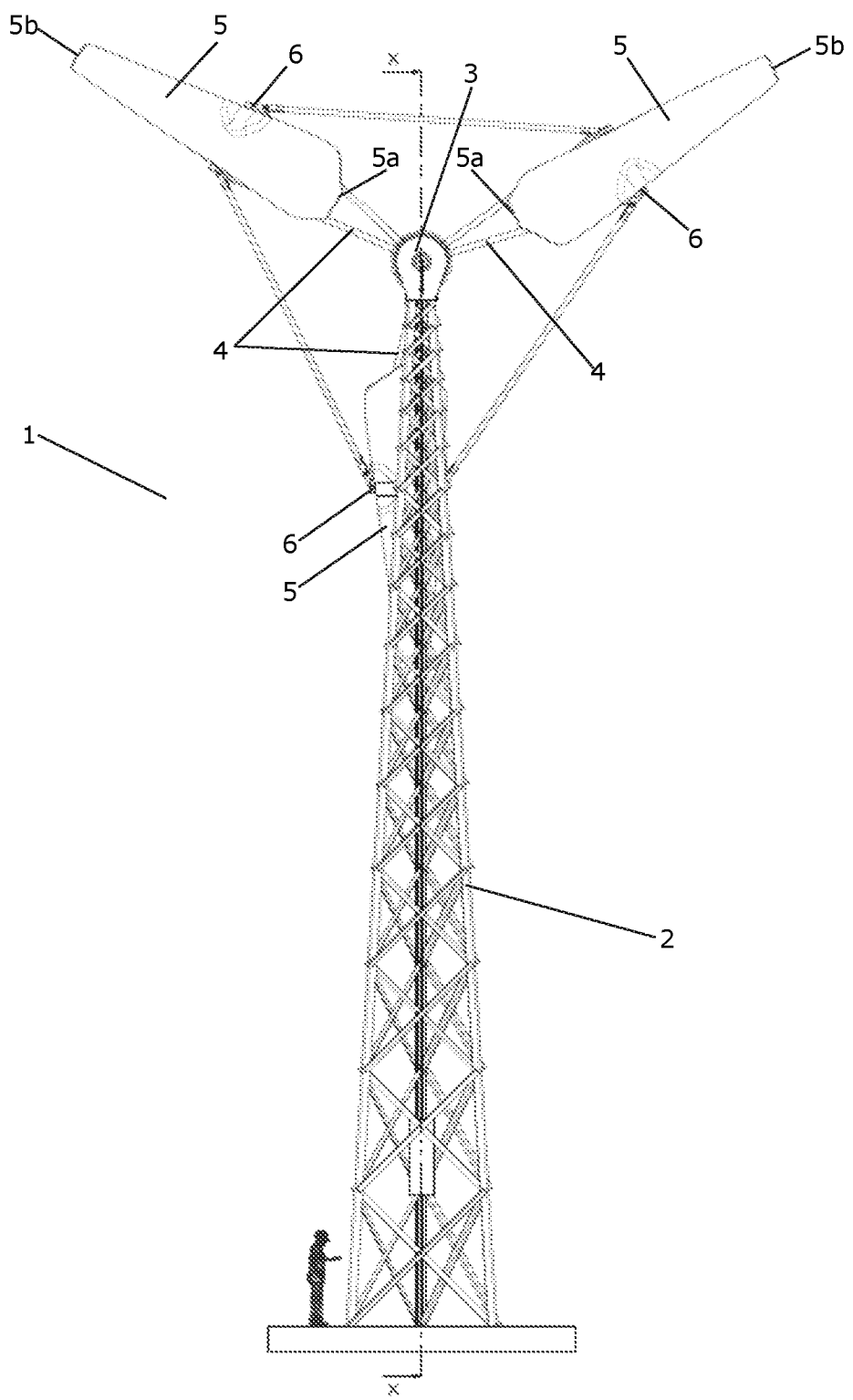
FIG. 1 is a view from behind of a wind turbine according to an embodiment of the invention.

FIG. 1 shows a wind turbine 1 according to an embodiment of the invention. The wind turbine 1 comprises a tower 2 and a nacelle 3 mounted on the tower 2. A hub (not visible) is mounted rotatably on the nacelle 3, the hub comprising a blade carrying structure 4 with three arms. A wind turbine blade 5 is connected to each of the arms of the blade carrying structure 4 via a hinge 6. Thus, the wind turbine blades 5 rotate along with the hub, relative to the nacelle 3, and the wind turbine blades 5 can perform pivoting movements relative to the blade carrying structure 4, via the hinges 6.

Each wind turbine blade 5 defines an aerodynamic profile having a chord which varies along the length of the wind turbine blade 5 between an inner tip end 5a and an outer tip end 5b. The hinge 6 is arranged at a hinge position of the wind turbine blade 5, the hinge position 6 being at a distance from the inner tip end 5a as well as at a distance from the outer tip end 5b, and the chord of the wind turbine blade 5 is larger at the hinge position than at the inner tip end 5a as well as at the outer tip end 5b.

Figure 2:
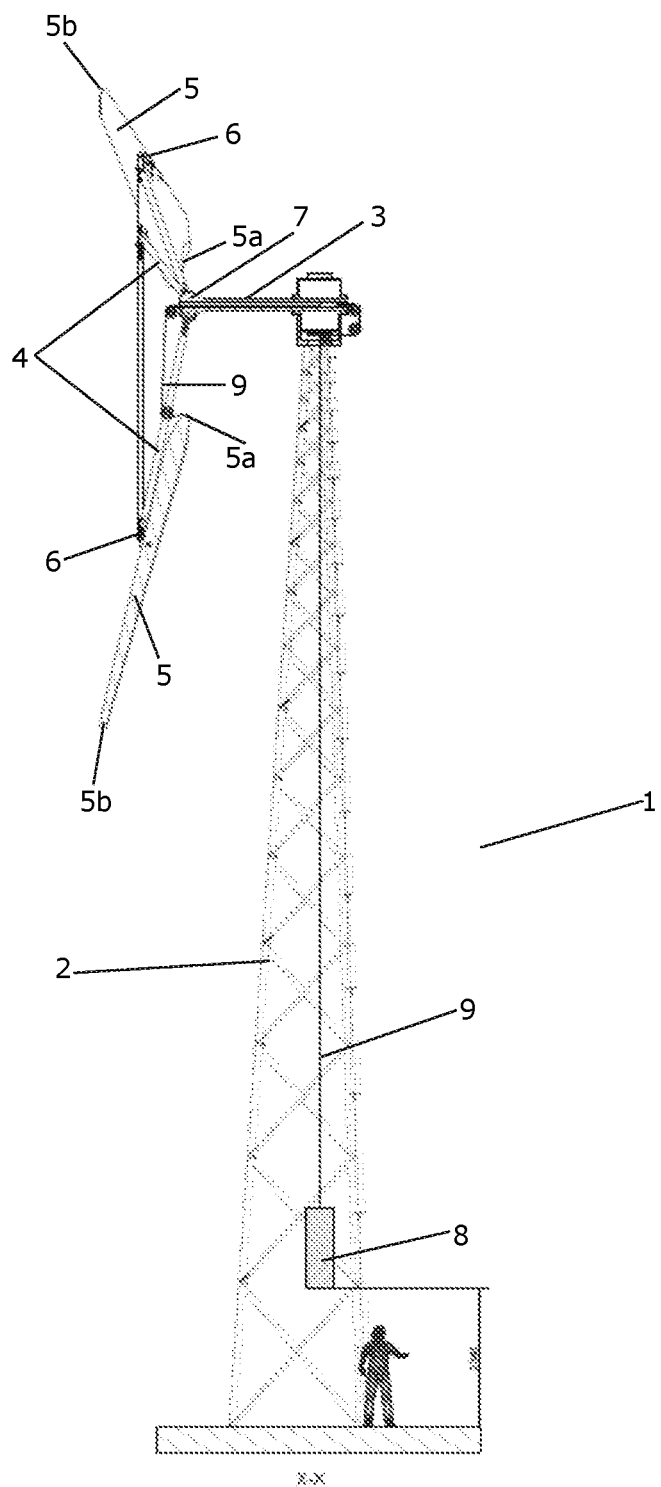
FIG. 2 is a side view of the wind turbine of FIG. 1 with the wind turbine blades in a first position.

FIG. 2 is a side view of the wind turbine 1 of FIG. 1. In FIG. 2 the hub 7 can be seen. The wind turbine blades 5 are in a position in which they define a maximum rotor diameter of the wind turbine 1. The wind turbine blades 5 are biased towards this position by each of the wind turbine blades 5 being connected to a weight 8 arranged inside the tower 2, via a wire 9. The weight 8 pulls the wire 9, and thereby pulls the wind turbine blades 5 towards the position shown in FIG. 2. Accordingly, when no other forces act on the wind turbine blades 5, the wind turbine blades 5 will be in the position shown in FIG. 2, and a maximum rotor diameter will be defined. This is the case when the wind speed is low, and the hub 7 therefore rotates at a low rotational speed.

Figure 3:
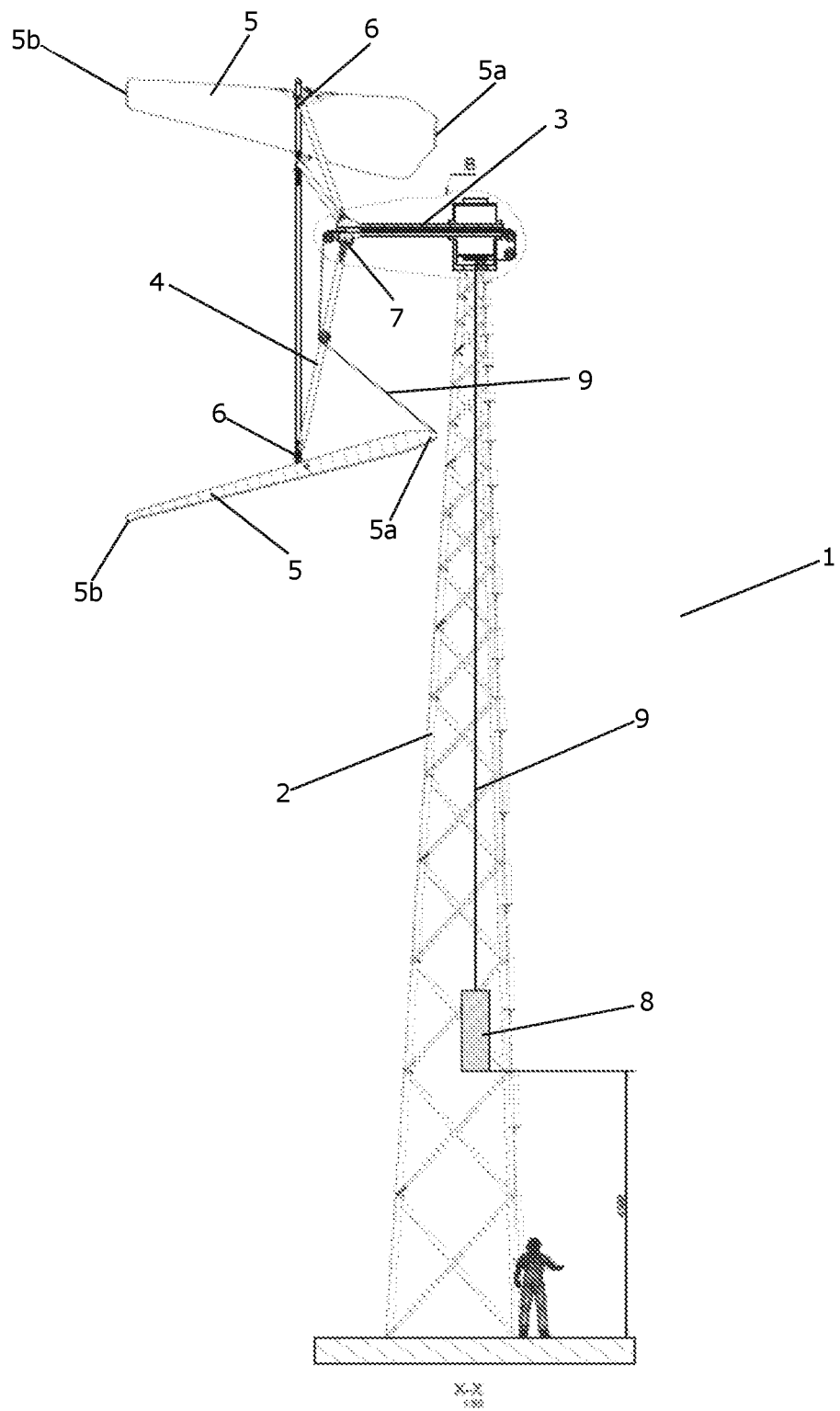
FIG. 3 is a side view of the wind turbine of FIGS. 1 and 2 with the wind turbine blades in a second position.

FIG. 3 is a side view of the wind turbine 1 of FIGS. 1 and 2. In FIG. 3 the wind speed is higher than in the situation illustrated in FIG. 2. Thereby a centrifugal force acts on the wind turbine blades 5, due to higher rotational speed of the hub 7. The centre of mass of each wind turbine blade 5 is positioned at a position between the hinge 6 and the inner tip end 5a. Therefore the centrifugal force acting on the wind turbine blades 5 seeks to pivot the wind turbine blades 5 towards the position illustrated in FIG. 3. Additionally, the aerodynamic forces acting on the wind turbine blades 5 seek to pivot the wind turbine blades 5 towards the position illustrated in FIG. 3. In the situation illustrated in FIG. 3, the centrifugal force in combination with the aerodynamic forces acting on the wind turbine blades 5 balance the total force vector in the same direction acting on the wind turbine blades 5, originating from the weight 8 and the wire 9. In general the pivot angle of the wind turbine blades 5 is changed with increased rotational speed and wind speed until a new state of equilibrium is found between all forces on the wind turbine blades 5. Obviously all other secondary forces and moments on the wind turbine blades 5, such as bearing friction at the hinge 6, are included as well.

The pivoting of the wind turbine blades 5 between the position shown in FIG. 2 and the position shown in FIG. 3 takes place gradually, and the exact position of the wind turbine blades 5 is a result of a balance between the force originating from the weight 8 and the centrifugal force.

In the situation illustrated in FIG. 3 the rotor diameter is significantly smaller than in the situation illustrated in FIG. 2. Accordingly, an increased wind speed automatically results in a smaller rotor diameter, and a decreased wind speed automatically results in a larger rotor diameter. Thus, the rotor diameter is automatically adapted to the prevailing wind conditions.

Figure 4:
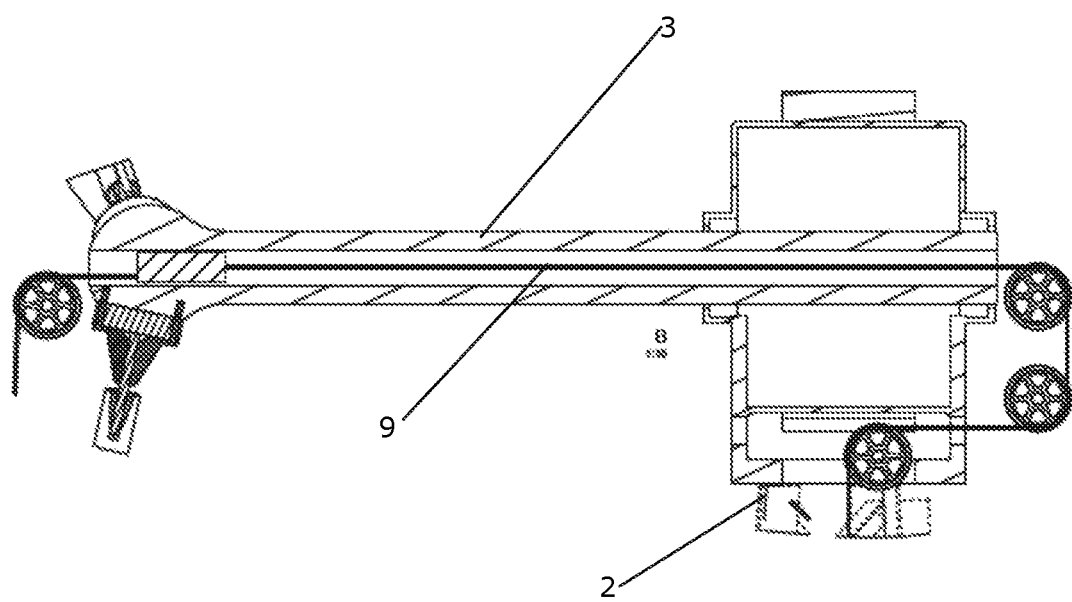
FIG. 4 is a cross sectional view of the nacelle of the wind turbine of FIGS. 1-3.

FIG. 4 is a cross sectional view of the nacelle 3 of the wind turbine of FIGS. 1-3. It can be seen how the wire 9 is guided through the nacelle 3 and into the tower 2.

Figure 5:
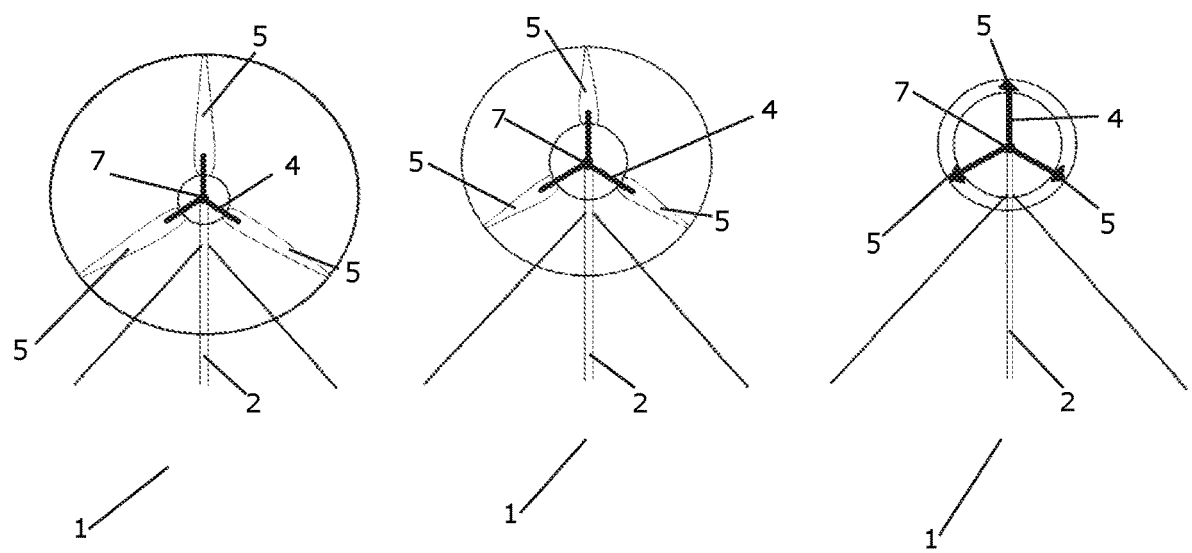
FIG. 5 illustrates a wind turbine according to an embodiment of the invention with the wind turbine blades in three different positions.

FIG. 5 illustrates a wind turbine 1 according to an embodiment of the invention at three different wind speeds. The wind turbine 1 could, e.g., be the wind turbine of FIGS. 1-3.

The left most drawing shows the wind turbine 1 at a low wind speed. In this case the rotational speed of the hub 7 is low, and therefore the centrifugal force acting on the wind turbine blades 5 is small. Accordingly, the rotor diameter is maximum.

The middle drawing shows the wind turbine 1 at a wind speed which is higher than the wind speed of the left most drawing. Accordingly, the rotational speed of the hub 7 is higher, and the centrifugal force acting on the wind turbine blades 5 is larger. Additionally, the aerodynamic forces acting on the wind turbine blades 5 are also larger. As a consequence, the wind turbine blades 5 have been pivoted towards a position defining a smaller rotor diameter.

The right most drawing shows the wind turbine 1 at a high wind speed. In this case the rotational speed of the hub 7 is very high, and therefore the centrifugal force acting on the wind turbine blades 5 is large. In addition, the aerodynamic forces at the high wind speed push the wind turbine blades 5 into the shown position. This has the consequence that the wind turbine blades 5 have been pivoted to a position defining a minimum rotor diameter. It can be seen that the wind turbine blades 5 are arranged substantially parallel to a rotational axis of the hub 7. This position is sometimes referred to as 'barrel mode'.

Figure 6:
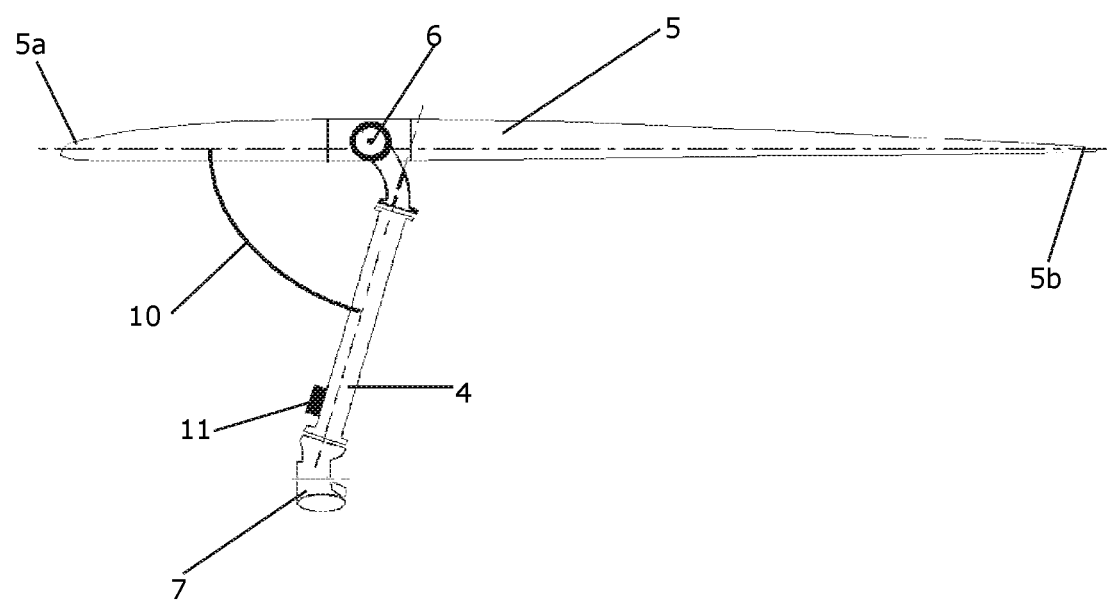
FIG. 6 shows a wind turbine blade for a wind turbine according to an embodiment of the invention.

FIG. 6 shows a wind turbine blade 5 for a wind turbine according to an embodiment of the invention. The wind turbine blade 5 is connected to a blade carrying structure 4 forming part of a hub 7, via a hinge 6. Thereby the wind turbine blade 5 is able to perform pivot movements relative to the blade carrying structure 4. The position of the wind turbine blade 5 relative to the blade carrying structure 4 defines a pivot angle 10. In FIG. 6 the wind turbine blade 5 is arranged with its longitudinal direction substantially parallel to a rotational axis of the hub 7. This position defines a maximum pivot angle 10. Furthermore, this position defines a minimum rotor diameter, as described above.

An end stop mechanism 11 in the form of a resilient pad is mounted on the blade carrying structure 4. When the wind turbine blade 5 is pivoted to a position defining a minimum pivot angle 10, the wind turbine blade 5 abuts the end stop mechanism 11, resulting in a soft stop for the pivot movement. Thereby collisions between the wind turbine blade 5 and the blade carrying structure 4 are avoided.

Figure 7:
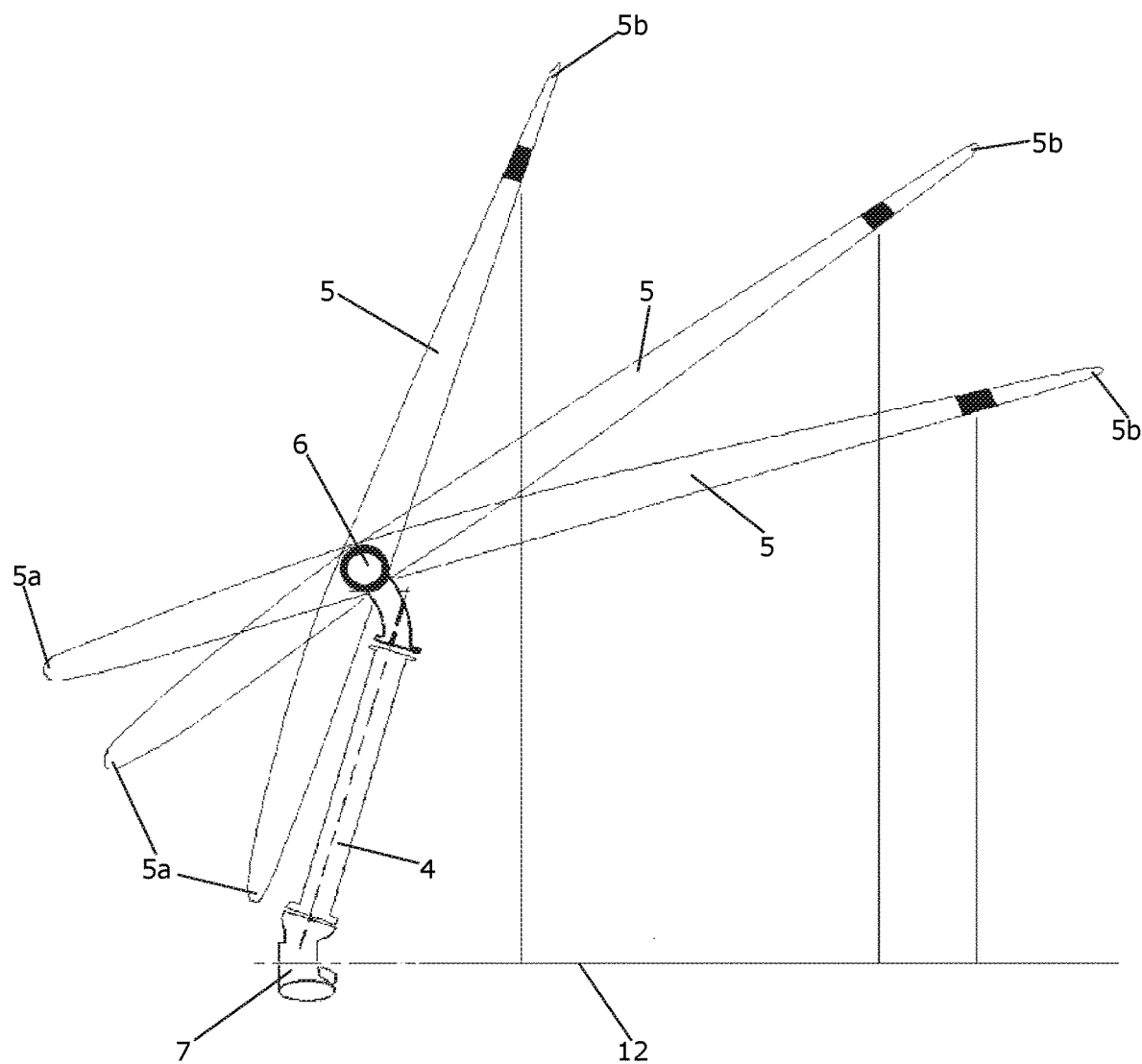
FIG. 7 shows the wind turbine blade of FIG. 6 in three different positions.

FIG. 7 shows the wind turbine blade 5 of FIG. 6 in three different positions, i.e. at three different pivot angles. It can be seen that the different pivot angles result in different distances between the wind turbine blade 5 and the rotational axis 12 of the hub 7, and thereby in different rotor diameters.

Figure 8:
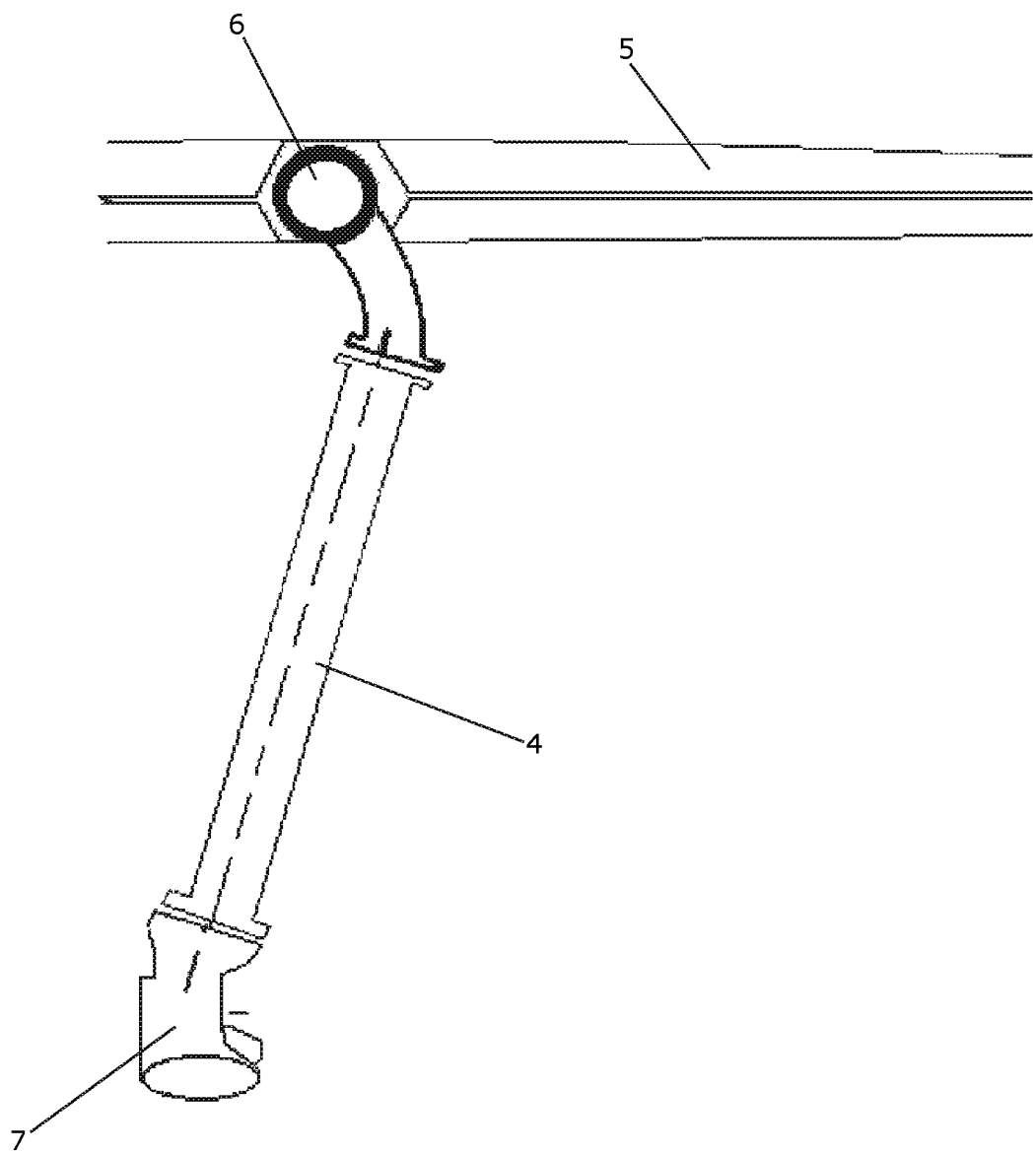
FIG. 8 shows a detail of the wind turbine blade of FIGS. 6 and 7.

FIG. 8 shows a detail of the wind turbine blade 5 of FIGS. 6 and 7. It can be seen that the hinge 6 is embedded in the wind turbine blade 5. As an alternative, the hinge 6 could be mounted on an outer surface of the wind turbine blade 5.

Figure 9:
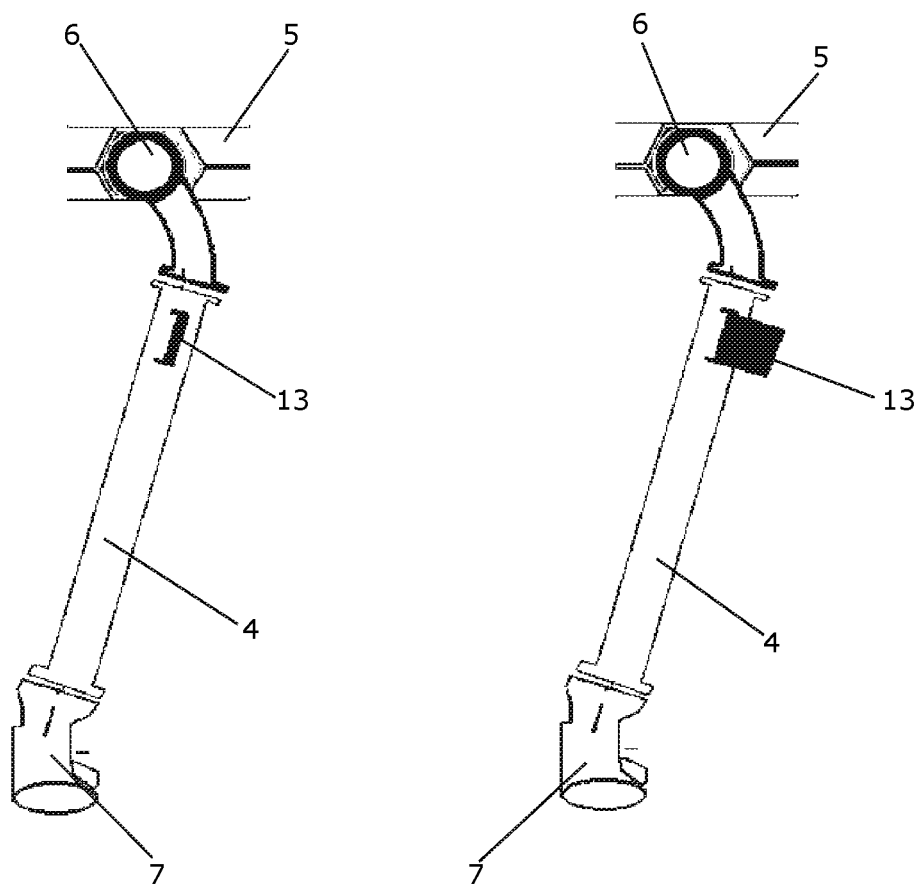
FIG. 9 shows a blade carrying structure comprising a deployable airbrake.

FIG. 9 shows a blade carrying structure 4 carrying a wind turbine blade 5 and having a deployable airbrake 13 mounted thereon.

In the left part of FIG. 9 the deployable airbrake 13 is in a retracted position, where it is almost flush with an outer surface of the blade carrying structure 4. When the deployable airbrake 13 is in this position, it performs no braking action, i.e. the deployable airbrake 13 does not restrict the rotational movement of the blade carrying structure 4, and thereby of the hub 7.

In the right part of FIG. 9 the deployable airbrake 13 is in a deployed position, where it protrudes from the outer surface of the blade carrying structure 4. When the deployable airbrake 13 is in this position, it restricts the rotational movements of the blade carrying structure 4, and thereby of the hub 7, due to wind resistance. Thereby the deployable airbrake 13 performs a braking action.

During normal operation, the deployable airbrake 13 may be in the retracted position illustrated in the left part of FIG. 9. When braking of the wind turbine is required, the deployable airbrake 13 may be moved to the deployed position illustrated in the right part of FIG. 9 in order to provide the braking action.

Figure 10:
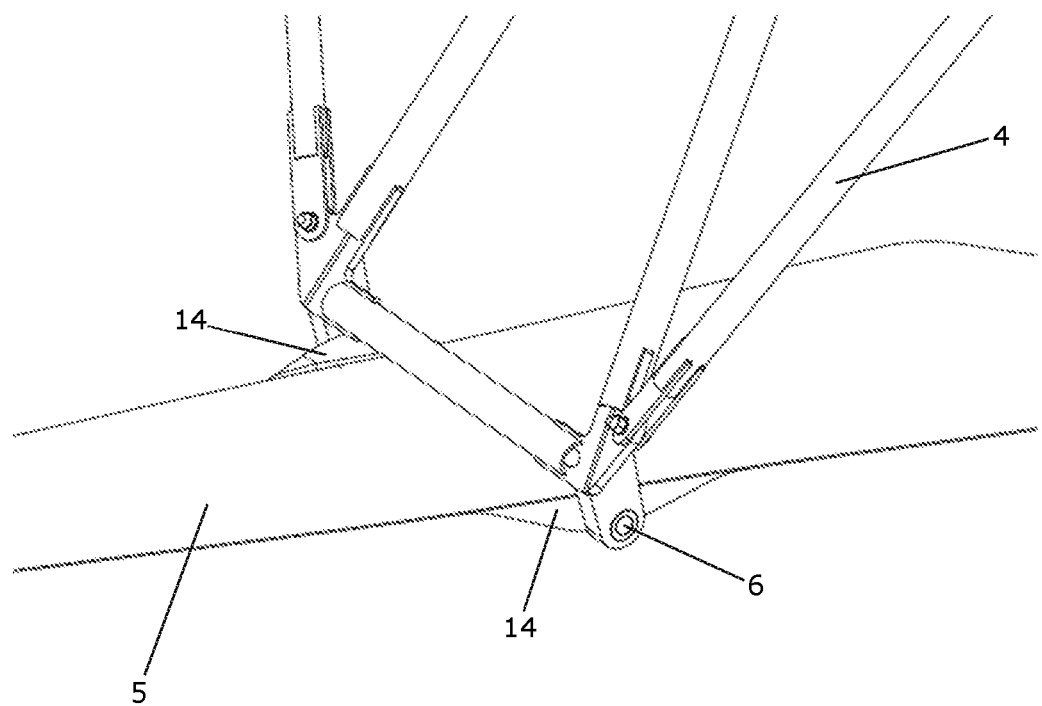
FIGS. 10 and 11 illustrate a hinge for a wind turbine blade of a wind turbine according to a first embodiment of the invention.
Figure 11:
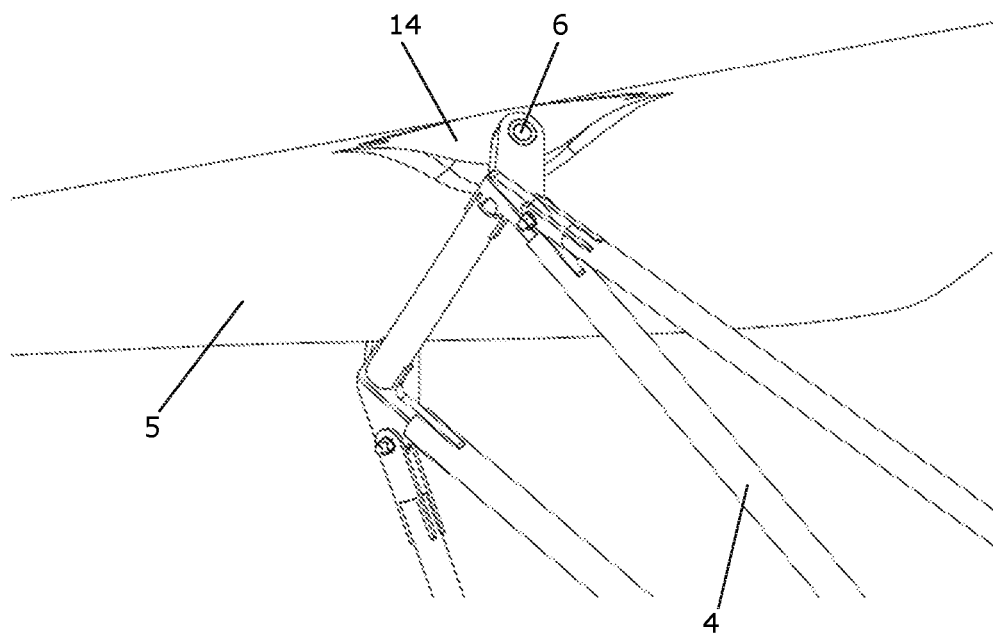

FIGS. 10 and 11 show a wind turbine blade 5 for a wind turbine according to a first embodiment of the invention from two different angles. The wind turbine blade 5 is connected to a blade carrying structure 4 via a hinge 6. The hinge 6 is connected to the wind turbine blade 5 via two brackets 14 attached to an outer surface of the wind turbine blade 5.

Figure 12:
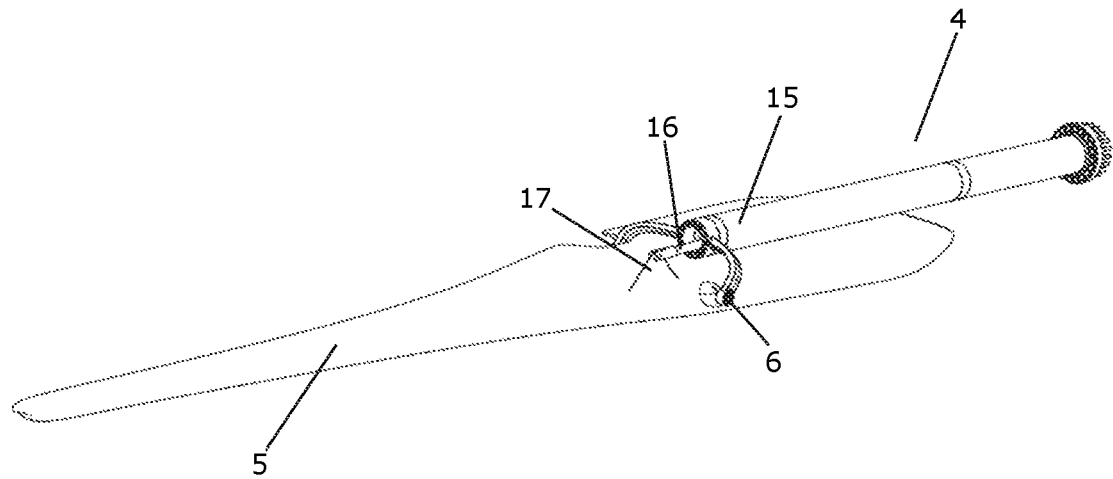
FIGS. 12 and 13 illustrate a hinge for a wind turbine blade of a wind turbine according to a second embodiment of the invention.
Figure 13:
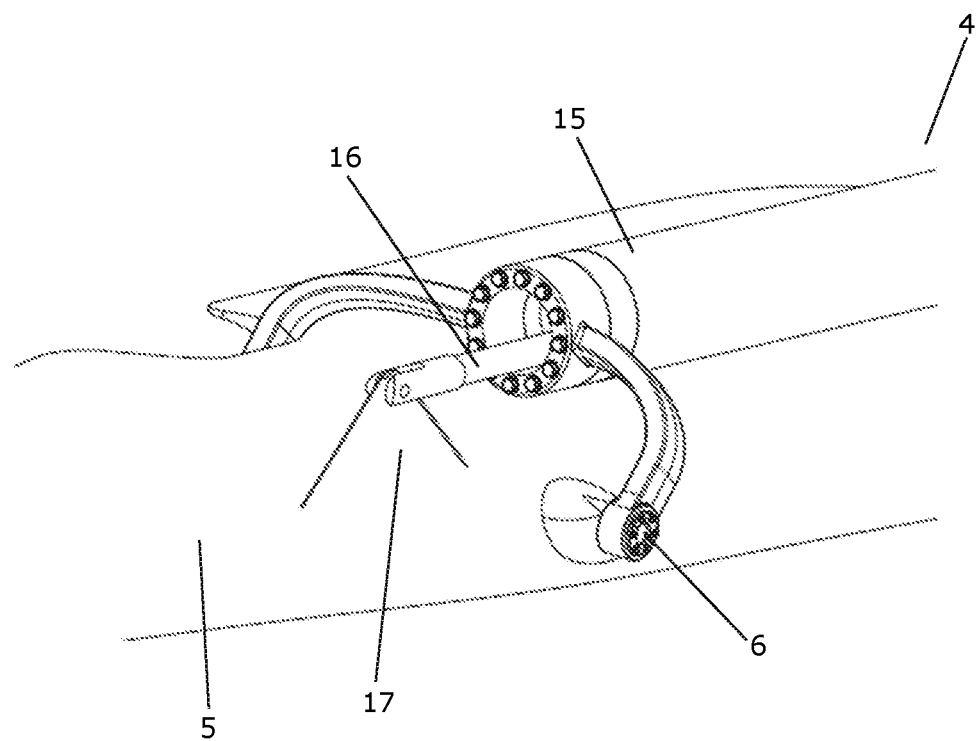

FIGS. 12 and 13 show a wind turbine blade 5 for a wind turbine according to a second embodiment of the invention. FIG. 12 shows the entire wind turbine blade 5, while FIG. 13 shows a detail of the wind turbine blade 5. The wind turbine blade 5 is connected to a blade carrying structure 4 via a hinge 6. The hinge 6 has a portion which is embedded in the wind turbine blade 5, and thereby the actual hinge 6 does not protrude from the outer surface of the wind turbine blade 5.

The part of the blade carrying structure 4 which is shown in FIGS. 12 and 13 comprises a cylinder 15 being directly connected to the hinge 6. A rod 16 is received in the cylinder 15. The rod 16 is mounted pivotally on a protruding portion 17 of the wind turbine blade 5. By moving the rod 16 inwards or outwards with a controlled force, the wind turbine blade 5 will pivot around the hinge 6 between a minimum pivot angle and a maximum pivot angle.

Figure 14:
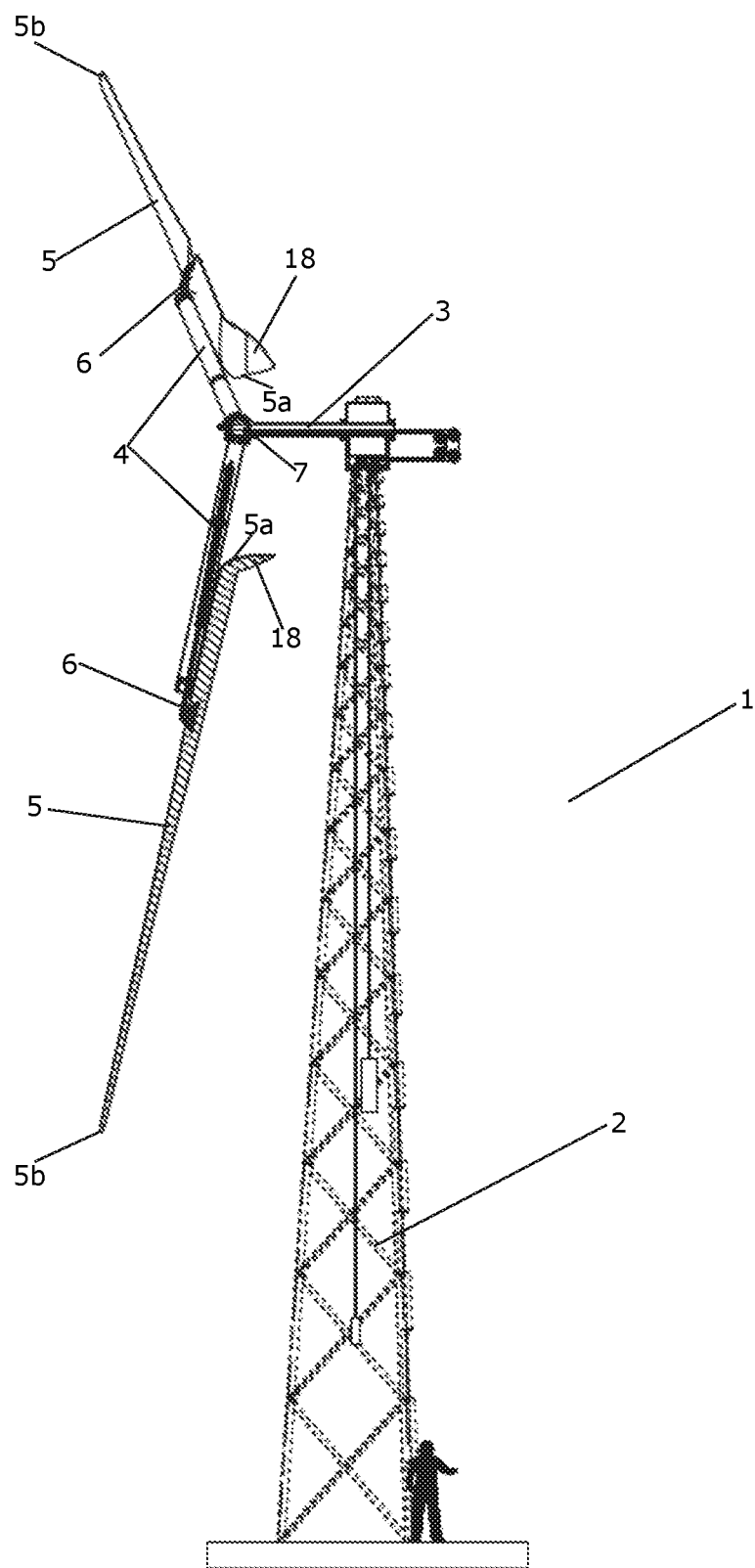
FIGS. 14-16 are side views of wind turbines according to three embodiments of the invention.

FIG. 14 is a side view of a wind turbine 1 according to an embodiment of the invention. The wind turbine 1 of FIG. 14 is very similar to the wind turbine 1 of FIGS. 1-3, and it will therefore not be described in detail here.

In the wind turbine 1 of FIG. 14, each of the wind turbine blades 5 is provided with a winglet 18 at the inner tip end 5a. The winglets 18 extend away from the blade carrying structure 4 and towards the pressure side of the wind turbine blades 5. The winglets 18 allow for a design of the wind turbine blades 5 in which specific aerodynamic properties are obtained with shorter wind turbine blades 5. In particular, providing the winglets 18 at the inner tip ends 5a as illustrated in FIG. 14 shortens the part of the wind turbine blade 5 arranged between the hinge 6 and the inner tip end 5a, thereby allowing a reduced overhang, i.e. the required distance between the tower 2 and the hub 7.

It should be noted that the winglets 18 could, alternatively, extend towards the blade carrying structure 4 and towards the suction side of the wind turbine blades 5. As another alternative, the wind turbine blades 5 could be provided with winglets 18 at the inner tip end 5a extending towards the pressure side as well as towards the suction side of the wind turbine blades 5.

Figure 15:
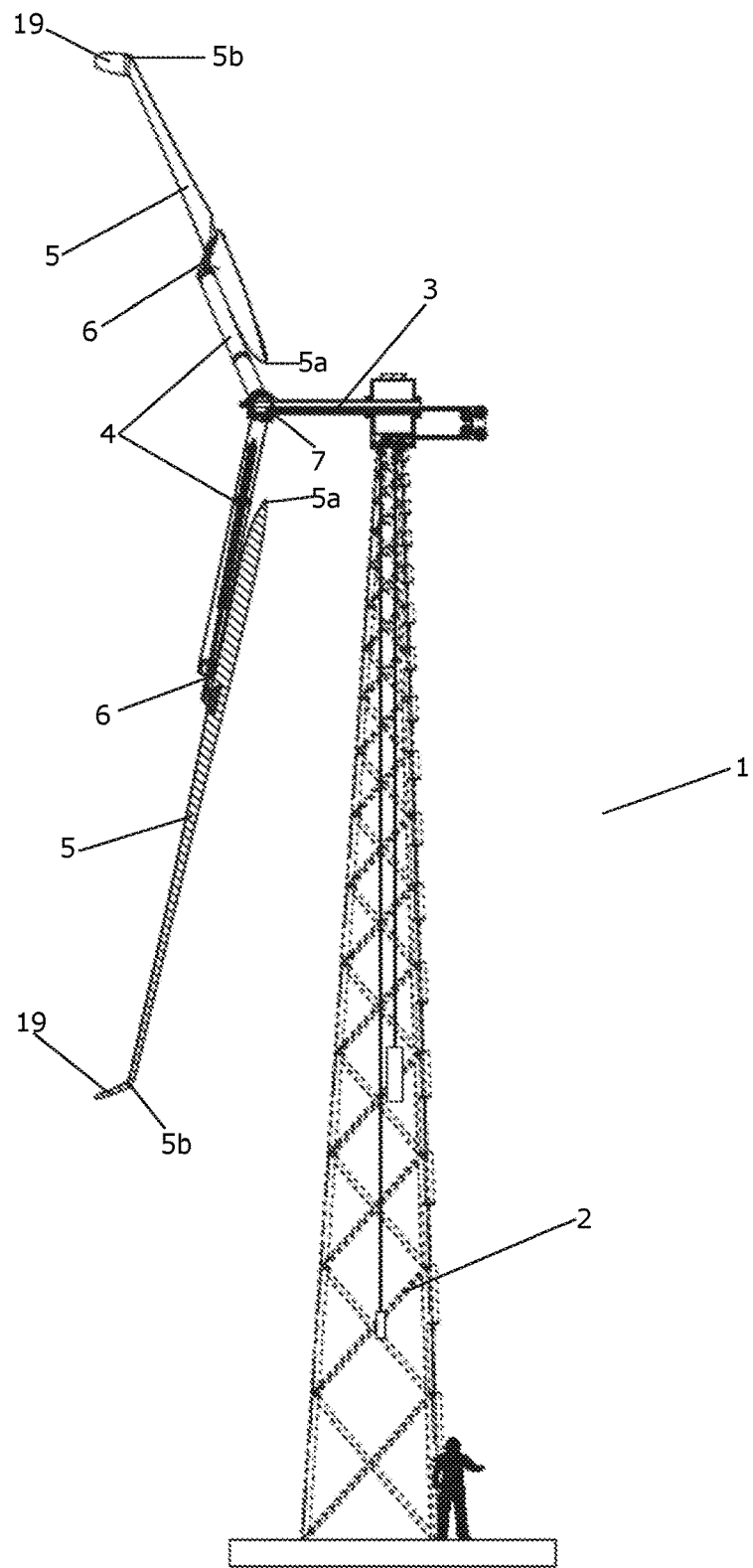

FIG. 15 is a side view of a wind turbine 1 according to an alternative embodiment of the invention. The wind turbine 1 of FIG. 15 is very similar to the wind turbine 1 of FIG. 14, and it will therefore not be described in detail here.

In the wind turbine 1 of FIG. 15, the inner tip ends 5a of the wind turbine blades 5 are not provided with winglets. Instead, each of the wind turbine blades 5 is provided with a winglet 19 at the outer tip end 5b. The winglets 19 extend towards the suction side of the wind turbine blades 5. Similarly to the embodiment of FIG. 14, the winglets 19 illustrated in FIG. 15 allow for a design of the wind turbine blades 5 in which specific aerodynamic properties are obtained with shorter wind turbine blades 5. In particular, providing the winglets 19 at the outer tip ends 5b as illustrated in FIG. 15 allows the length of the part of the wind turbine blade 5 arranged between the hinge 6 and the outer tip end 5b to be reduced, thereby resulting in less complicated blade transport.

It should be noted that the winglets 19 could, alternatively, extend towards the pressure side of the wind turbine blades 5. As another alternative, the wind turbine blades 5 could be provided with winglets 19 at the outer tip end 5b extending towards the pressure side as well as towards the suction side of the wind turbine blade 5.

Figure 16:
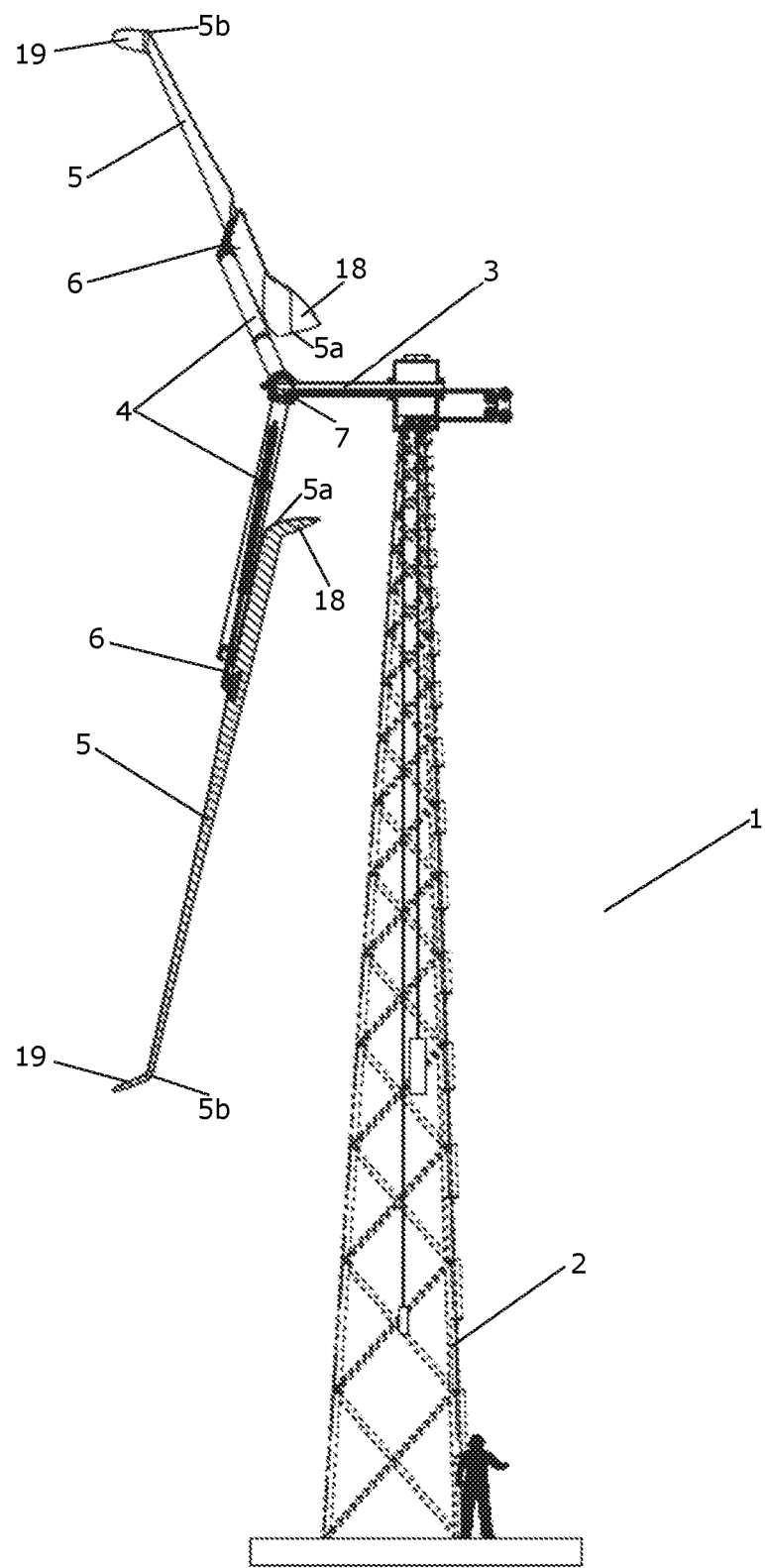

FIG. 16 is a side view of a wind turbine 1 according to another alternative embodiment of the invention. The wind turbine 1 of FIG. 16 is very similar to the wind turbines 1 of FIGS. 14 and 15, and it will therefore not be described in detail here.

In the wind turbine 1 of FIG. 16, each of the wind turbine blades 5 is provided with a winglet 18 at the inner tip end 5a, as described above with reference to FIG. 14, as well as a winglet 19 at the outer tip end 5b, as described above with reference to FIG. 15.

It should be noted that, even though the winglets 18, 19 illustrated in FIG. 16 are such that the winglets 18 at the inner tip end 5a extend towards the pressure side of the wind turbine blades 5 and the winglets 19 at the outer tip end 5b extend towards the suction side of the wind turbine blades 5, it could also be envisaged that both winglets 18, 19 extend towards the pressure side of the wind turbine blade 5, that both winglets 18, 19 extend towards the suction side of the wind turbine blade 5, or that the winglets 18 at the inner tip end 5a extend towards the suction side of the wind turbine blade 5, while the winglets 19 at the outer tip end 5b extend towards the pressure side of the wind turbine blade 5. As another alternative, the wind turbine blades 5 could be provided with winglets at the inner tip end 5a and/or at the outer tip end 5b which extend towards the pressure side as well as towards the suction side of the wind turbine blades 5.

It should further be noted that the winglets 18, 19 illustrated in FIGS. 14-16 could attain various geometric forms and inclination angles, i.e. the angle between the winglet 18, 19 and the main wind turbine blade 5. The winglets 18, 19 shown in FIGS. 14-16 are illustrations on two possible variants, where winglet 18 has a sharp winglet end, and winglet 19 has a rounded winglet end. The inclination angle is in both cases about 60°. In other preferred embodiments the inclination angle may be about 90°.

The invention claimed is:

1. A wind turbine comprising a tower, a nacelle mounted on the tower via a yaw system, a hub mounted rotatably on the nacelle, the hub comprising a blade carrying structure, and one or more wind turbine blades connected to the blade carrying structure,
   wherein each of the wind turbine blades defines an aerodynamic profile having a chord which varies along a length of the wind turbine blade between an inner tip end and an outer tip end, and wherein each of the wind turbine blades is connected to the blade carrying structure via a hinge at a hinge position of the wind turbine blade, each wind turbine blade thereby being arranged to perform pivot movements relative to the blade carrying structure between a minimum pivot angle and a maximum pivot angle, the hinge position being arranged at a distance from the inner tip end and at a distance from the outer tip end such that the inner tip end moves through an arc relative to the hinge position during the pivot movements, and wherein the chord at the hinge position is larger than or equal to the chord at the inner tip end and larger than the chord at the outer tip end.

2. The wind turbine according to claim 1, wherein the hinge position of each of the wind turbine blades is at a position defining a maximum chord.

3. The wind turbine according to claim 1, wherein the chord of the aerodynamic profile of each of the wind turbine blades decreases from the hinge position towards the inner tip end and from the hinge position towards the outer tip end.

4. The wind turbine according to claim 1, wherein each of the wind turbine blades has a centre of mass for the wind turbine blade at rest, the centre of mass being positioned between the hinge position and the inner tip end of the wind turbine blade.

5. The wind turbine according to claim 1, further comprising a balancing mass arranged on the nacelle at a position opposite to an attachment position of the hub.

6. The wind turbine according to claim 1, wherein the wind turbine is a downwind wind turbine.

7. The wind turbine according to claim 1, further comprising biasing means biasing the wind turbine blades towards a position providing a maximum rotor diameter of the wind turbine.

8. The wind turbine according to claim 1, further comprising end stop mechanisms arranged to slow pivot movements of the wind turbine blades in a region near the minimum pivot angle and/or in a region near the maximum pivot angle.

9. The wind turbine according to claim 8, wherein the end stop mechanism comprises a spring and/or a damper.

10. The wind turbine according to claim 1, further comprising a stop mechanism arranged to move the wind turbine blades to a safe pivot angle in the case of an emergency.

11. The wind turbine according to claim 10, wherein the safe pivot angle arranges the wind turbine blades in such a manner that each wind turbine blade extends along a direction which is substantially parallel to a rotational axis of the hub.

12. The wind turbine according to claim 10, wherein the stop mechanism comprises a release mechanism and at least one spring biased wire interconnecting the release mechanism and each of the wind turbine blades.

13. The wind turbine according to claim 1, wherein the blade carrying structure comprises one or more arms, and wherein each of the wind turbine blades is mounted on one of the arms of the blade carrying structure.

14. The wind turbine according to claim 1, wherein each of the wind turbine blades comprises an inner portion including the inner tip end and an outer portion including the outer tip end, and wherein the inner portion and the outer portion are joined to each other.

15. The wind turbine according to claim 14, wherein each of the wind turbine blades further comprises a hinge portion including the hinge position, and wherein the hinge portion interconnects the inner portion and the outer portion.

16. The wind turbine according to claim 1, wherein the hinge of each of the wind turbine blades is embedded in the wind turbine blade.

17. The wind turbine according to claim 1, wherein each of the wind turbine blades is provided with at least one winglet.

18. The wind turbine according to claim 1, further comprising at least one deployable airbrake.

19. The wind turbine according to claim 1, wherein the hinge position of each of the wind turbine blades is at a position defining a maximum thickness of the wind turbine blade.

20. The wind turbine according to claim 1, wherein the hinge position of each of the wind turbine blades is at a position other than that defining a maximum chord.

* * * * *